United States Patent
Kameyama

(10) Patent No.: US 11,196,368 B2
(45) Date of Patent: Dec. 7, 2021

(54) MOTOR CONTROL APPARATUS THAT PERFORMS PROCESSING FOR DETECTING STOP POSITION OF ROTOR, AND IMAGE FORMING APPARATUS

(71) Applicant: CANON KABUSHIKI KAISHA, Tokyo (JP)

(72) Inventor: Shigeru Kameyama, Mishima (JP)

(73) Assignee: Canon Kabushiki Kaisha, Tokyo (JP)

(*) Notice: Subject to any disclaimer, the term of this patent is extended or adjusted under 35 U.S.C. 154(b) by 63 days.

(21) Appl. No.: 16/205,770

(22) Filed: Nov. 30, 2018

(65) Prior Publication Data
US 2019/0173402 A1 Jun. 6, 2019

(30) Foreign Application Priority Data
Dec. 6, 2017 (JP) .............................. JP2017-234299

(51) Int. Cl.
*H02P 6/185* (2016.01)
*G03G 15/00* (2006.01)
*G03G 21/16* (2006.01)

(52) U.S. Cl.
CPC .......... *H02P 6/185* (2013.01); *G03G 15/757* (2013.01); *G03G 15/80* (2013.01); *G03G 21/16* (2013.01); *H02P 2203/03* (2013.01)

(58) Field of Classification Search
CPC ..... H02P 6/185; H02P 2203/03; G03G 21/16; G03G 15/757
See application file for complete search history.

(56) References Cited

U.S. PATENT DOCUMENTS

| | | | |
|---|---|---|---|
| 5,493,188 A * | 2/1996 | Yoshikawa | H02P 6/24 318/400.09 |
| 9,431,940 B2 | 8/2016 | Kameyama | |
| 2005/0151499 A1* | 7/2005 | Koide | G11B 19/2054 318/650 |
| 2013/0272728 A1* | 10/2013 | Fukutani | G03G 15/0131 399/36 |
| 2015/0145454 A1* | 5/2015 | Kameyama | G03G 15/5008 318/400.32 |
| 2020/0144944 A1* | 5/2020 | Kanazawa | H02P 6/22 |

FOREIGN PATENT DOCUMENTS

JP    2015104263 A    6/2015

* cited by examiner

*Primary Examiner* — Kawing Chan
*Assistant Examiner* — Bradley R Brown
(74) *Attorney, Agent, or Firm* — Venable LLP

(57) ABSTRACT

A motor control apparatus, includes: a voltage control unit configured to control a voltage to apply to a plurality of coils in order to cause a rotor of a motor that includes the plurality of coils to rotate; a holding unit configured to hold information that indicates a magnitude of a load of the motor; and a detection unit configured to, based on the information that indicates the magnitude of the load that is held by the holding unit, set a detection condition for a stop position of the rotor, and perform detection processing of the stop position of the rotor in accordance with the set detection condition.

15 Claims, 13 Drawing Sheets

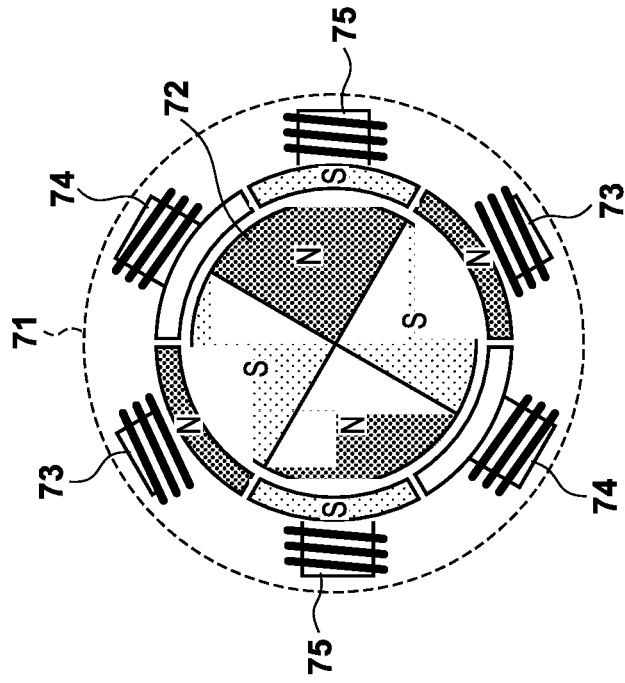
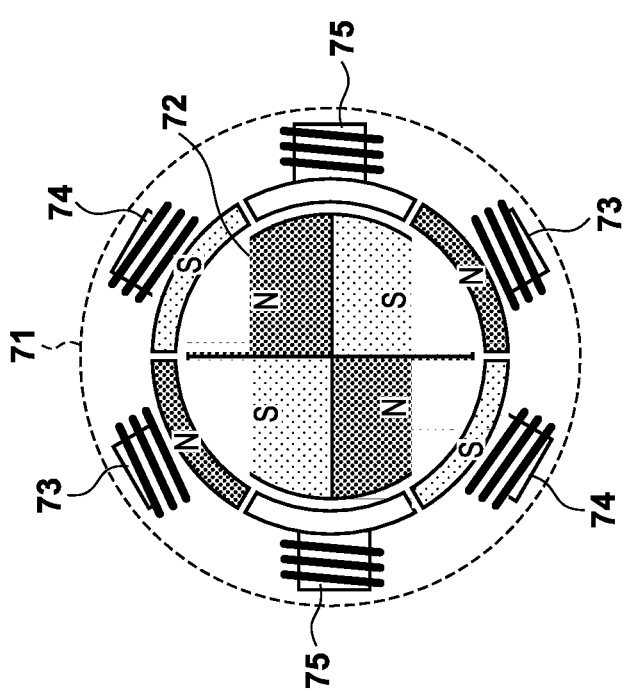

MOTOR CONTROL APPARATUS THAT PERFORMS PROCESSING FOR DETECTING STOP POSITION OF ROTOR, AND IMAGE FORMING APPARATUS

BACKGROUND OF THE INVENTION

Field of the Invention

The present invention relates to a technique for controlling a motor.

Description of the Related Art

A sensorless DC brushless motor which is not mounted with a sensor for detecting a rotor position is used as a driving source for a rotation member in an image forming apparatus. With respect to the sensorless DC brushless motor, to avoid problems such as reverse rotation or loss of synchronism at a time of activation, the position of the rotor when the motor is stopped is detected (hereinafter referred to as a rotor stop position), and activation processing in accordance with the rotor stop position is performed. US-2015-145454 discloses a configuration for detecting a rotor stop position based on an excitation current when a voltage is applied to a coil for only a short time.

To accurately detect the rotor stop position, it is advantageous to have a long time period in which the voltage is applied to the coil, and have a large excitation current. However, when the excitation current is made too large, the rotor will move by the torque generated by the excitation current, and it will be impossible to accurately detect the rotor stop position. To prevent the rotor from moving during detection of the rotor stop position, it is necessary to set a voltage application time period by assuming a case where the load torque is a minimum. Note that, because the excitation current decreases and the S/N ratio degrades as the voltage application time period becomes smaller, processing such as measuring the excitation current a plurality of times and taking an average is necessary. In this way, when detection conditions such as a plurality of measurements and a voltage application time period in consideration of the case where the load torque is a minimum are set, the amount of time required for processing to detect the stop position of the rotor lengthens unnecessarily.

SUMMARY OF THE INVENTION

According to an aspect of the present invention, a motor control apparatus, includes: a voltage control unit configured to control a voltage to apply to a plurality of coils in order to cause a rotor of a motor that includes the plurality of coils to rotate; a holding unit configured to hold information that indicates a magnitude of a load of the motor; and a detection unit configured to, based on the information that indicates the magnitude of the load that is held by the holding unit, set a detection condition for a stop position of the rotor, and perform detection processing of the stop position of the rotor in accordance with the set detection condition.

Further features of the present invention will become apparent from the following description of exemplary embodiments with reference to the attached drawings.

BRIEF DESCRIPTION OF THE DRAWINGS

FIGS. 4A and 4B are configuration views of the motor according to an embodiment.

DESCRIPTION OF THE EMBODIMENTS

Exemplary embodiments of the present invention will be described hereinafter, with reference to the drawings. Note, the following embodiments are examples and the present invention is not limited to the content of the embodiments. Also, for the following drawings, elements that are not necessary in the description of the embodiment are omitted from the drawings.

First Embodiment

Figure 1:
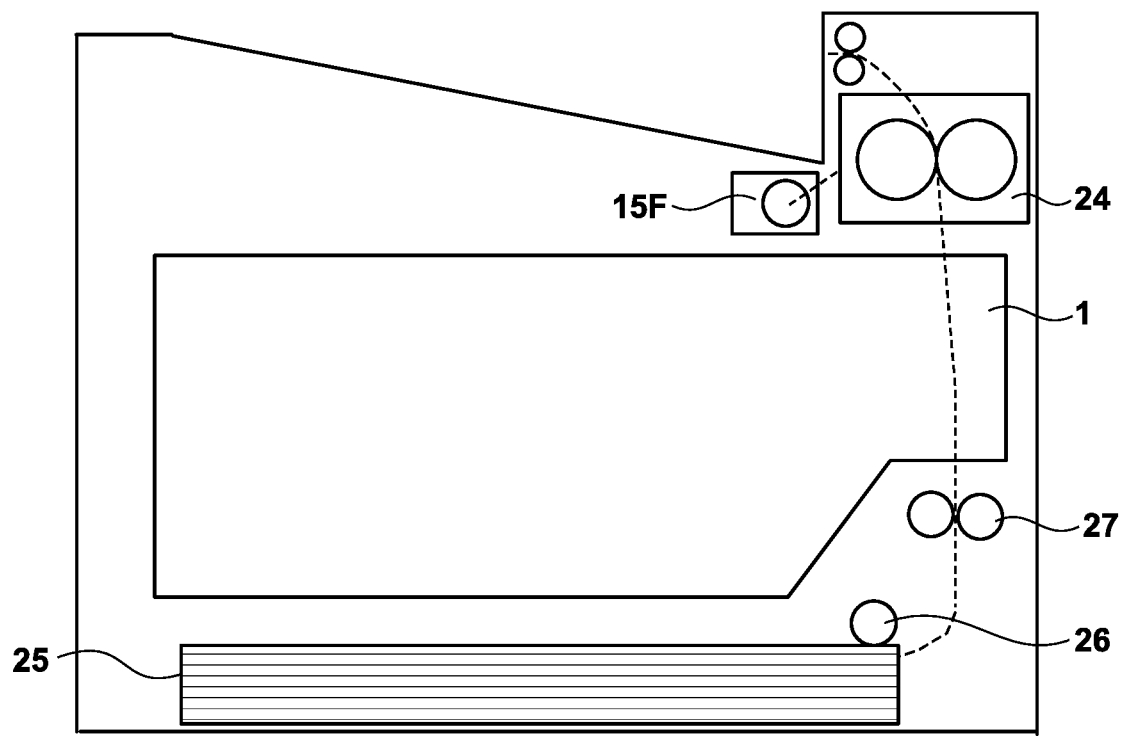
FIG. 1 is a configuration view of an image forming apparatus according to an embodiment.

FIG. 1 is a configuration view of an image forming apparatus according to this embodiment. The image forming apparatus may be any of a printing apparatus, a printer, a copying machine, a multifunction peripheral, and a facsimile machine, for example. A sheet stored in a feed cassette 25 of the image forming apparatus is conveyed along a conveyance path by a feed roller 26 and conveyance rollers 27. An image forming unit 1 forms yellow, magenta, cyan, and black toner images, and transfers these toner images to a sheet conveyed on the conveyance path. A fixing device 24 has a heating roller and a pressure roller, and applies heat and pressure to a sheet to which toner images have been transferred to cause the toner images to fix the sheet. The sheet to which processing for fixing toner images has been performed is discharged to outside of the image forming apparatus. A motor 15F is a driving source that causes a roller of the fixing device 24 to rotate.

Figure 2:
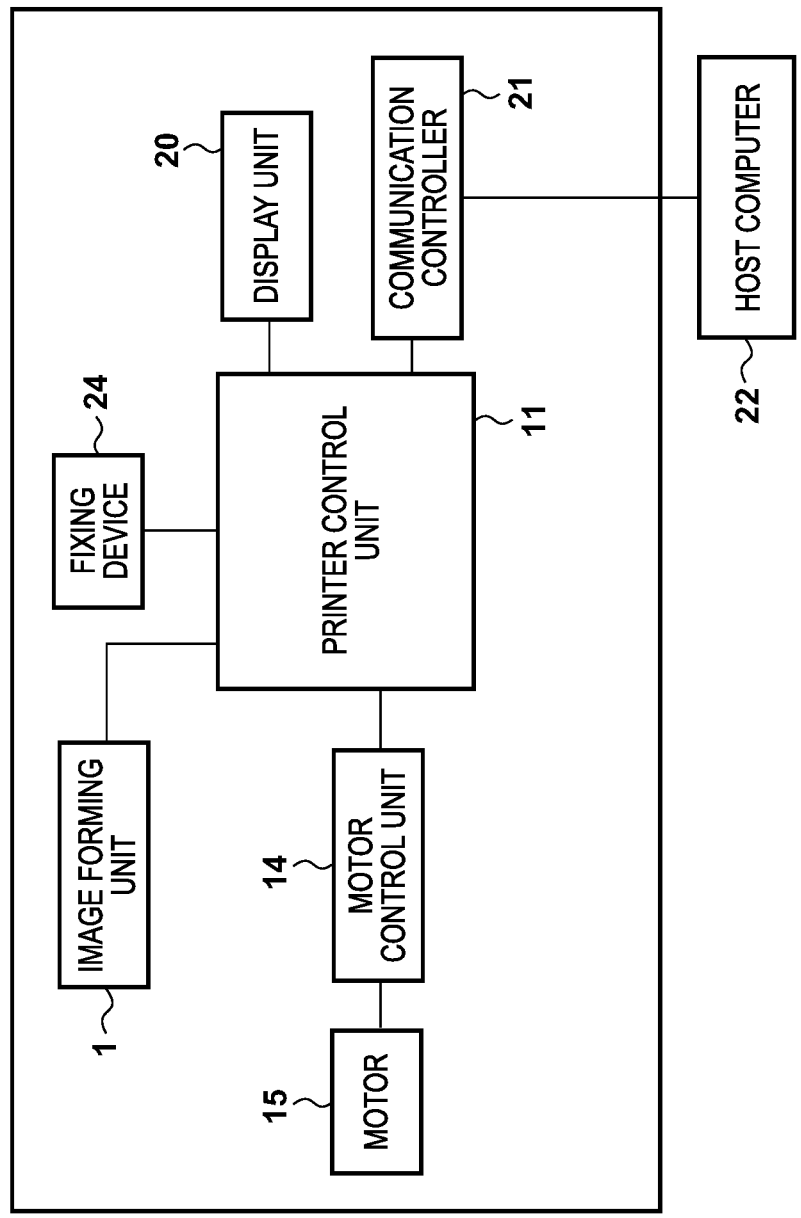
FIG. 2 is a view that illustrates a control configuration of the image forming apparatus according to the embodiment.

FIG. 2 illustrates a control configuration of the image forming apparatus. A printer control unit 11, upon receiving image data for an image to form from a host computer 22 via a communication controller 21, controls the image forming unit 1 to form toner images on a sheet, and controls the fixing device 24 to cause the toner images to be fixed to the sheet. At this point, the printer control unit 11 controls a motor control unit 14 to control motors 15 including the motor 15F to perform sheet conveyance control or the like. In addition, the printer control unit 11 displays a state of the image forming apparatus on a display unit 20. Note that the printer control unit 11 has a microcomputer and a memory. The memory holds various control programs and data, and the microcomputer controls each unit of the image forming apparatus based on, for example, the various control programs or data stored in the memory.

Figure 3:
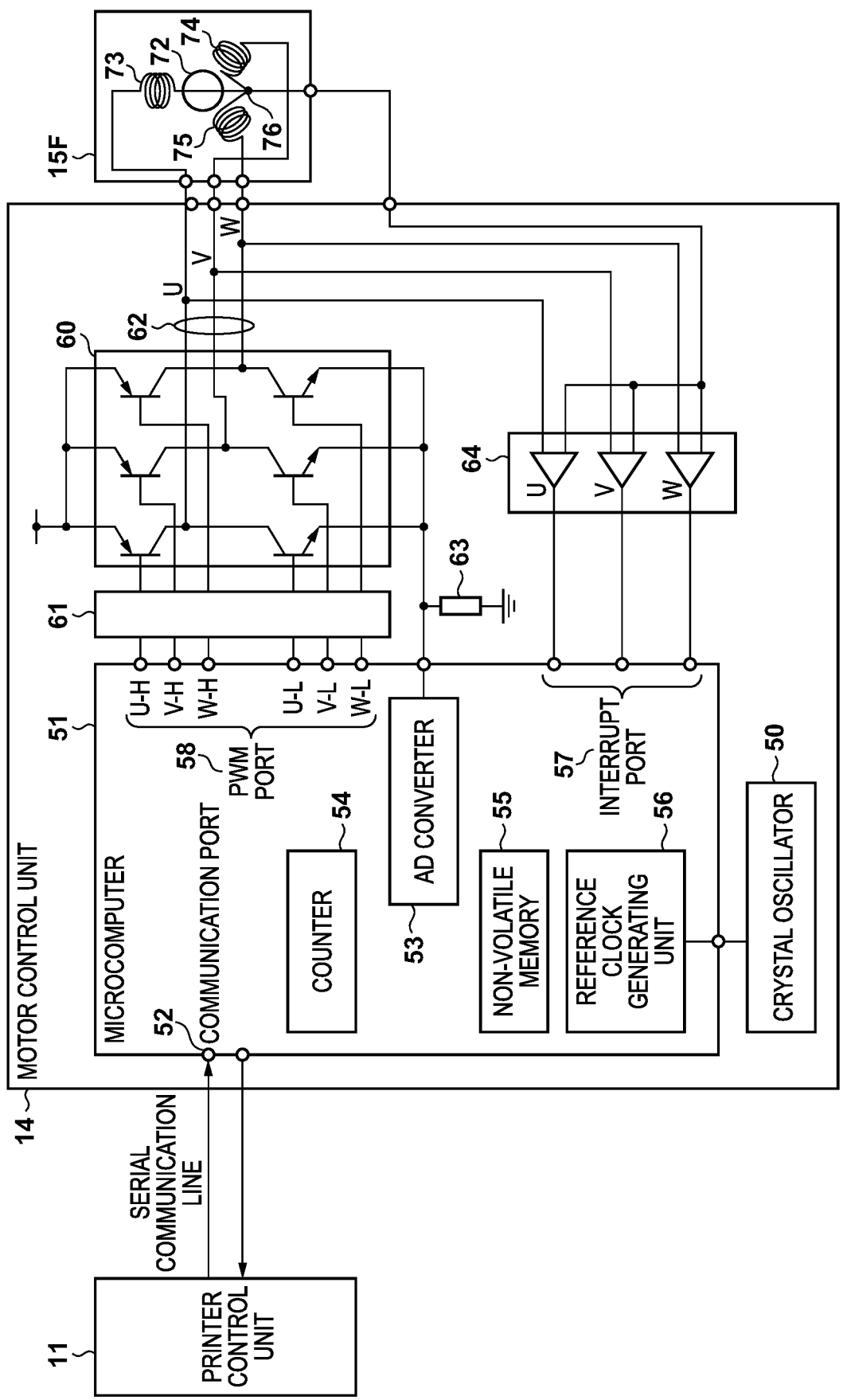
FIG. 3 is a configuration view of a motor control unit according to an embodiment.

FIG. 3 illustrates details of the control configuration of the motor 15F. The motor control unit 14 has a microcomputer 51. The microcomputer 51 communicates with the printer control unit 11 via a communication port 52. In addition, a reference clock generating unit 56 of the microcomputer 51 is connected to a crystal oscillator 50, and generates a reference clock based on output of the crystal oscillator 50. A counter 54 performs a count operation based on the reference clock. The microcomputer 51 outputs PWM signals from PWM ports 58. In the present embodiment, the microcomputer 51 outputs a total of six PWM signals: three high side PWM signals (U-H, V-H, and W-H) and three low side PWM signals (U-L, V-L, and W-L), in correspondence with three phases of the motor 15F (U, V, and W).

The PWM ports 58 are connected to a gate driver 61, and the gate driver 61 performs on/off control of each switching element of a three-phase inverter 60, based on the PWM signals. Note that the inverter 60 has a total of six switching elements—three for the high side and three for the low side for respective phases, and the gate driver 61 performs control based on the PWM signals which correspond to respective switching elements. A transistor or a FET can be used as a switching element, for example. In the present embodiment, it is assumed that when a PWM signal is high, a corresponding switching element is on, and when the PWM signal is low, the corresponding switching element is off. Outputs 62 of the inverter 60 are connected to a coil 73 (U phase), a coil 74 (V phase), and a coil 75 (W phase) of the motor. By performing on/off control of each switching element of the inverter 60, it is possible to control the excitation current of each of the coils 73, 74, and 75. In this way, the microcomputer 51, the gate driver 61, and the inverter 60 function as a voltage control unit for controlling voltages to apply to the plurality of coils 73, 74, and 75.

The excitation currents that flow to the coils 73, 74, 75 are converted to voltages by a resistor 63, and inputted to an AD converter 53 of the microcomputer 51. In addition, the motor control unit 14 has a comparator 64 for comparing each voltage of the outputs 62 of the inverter 60 with the voltage of a neutral point 76 that the coils 73, 74, and 75 connect to. Outputs of the comparator 64 are inputted to interrupt ports 57 of the microcomputer 51. In addition, the microcomputer 51 has a non-volatile memory 55 for storing, for example, various pieces of data used in control of the motor 15F.

FIG. 4A and FIG. 4B are configuration views of the motor 15F. The motor 15F has a six-slot stator 71, and a four-pole rotor 72. The stator 71 has the coils 73, 74, and 75 for each phase. The rotor 72 is configured by a permanent magnet, and has two pairs of an N(north)-pole and an S(south)-pole. For the rotor 72, a position to stop is decided in accordance with an excitation phase. Note that the excitation phase is indicated by a permutation of two coils out of the plurality of coils 73, 74, and 75. In other words, there are a total of six excitation phases: U-V, U-W, V-U, V-W, W-U, and W-V. Here, the U-V phase means that an excitation current flows from the coil 73 of the U phase to the coil 74 of the V phase, via the neutral point 76.

For example, when the U-V phase is excited, the rotor 72 stops at the rotation position illustrated by FIG. 4A. Note that it is assumed at this point that the U phase is the N(north)-poles, and the V phase is the S(south)-poles. Next, when the U-W phase is excited, the rotor 72 stops at the rotation position illustrated by FIG. 4B. Causing the rotor 72 to rotate from one stop position to an adjacent stop position, for example from the position of FIG. 4A to the position of FIG. 4B, is represented as causing the rotor 72 to move one step, or advance one step.

When driving of the motor 15F stops and the excitation current is set to 0, force that holds the rotor 72 ceases to act, and the rotor 72 will rotate if a rotational force is applied from outside to the rotor 72. Accordingly, when the fixing device 24 is attached to or released from the image forming apparatus, or when a sheet that was caught in the fixing device 24 due to a jam is removed, the rotor 72 may rotate. At this point, the motor control unit 14 ceases to know the stop position of the rotor 72. In addition, the motor control unit 14 also does not know the stop position of the rotor 72 immediately after the power supply of the image forming apparatus is activated. Accordingly, in a case of causing the motor 15F to rotate, the motor control unit 14 first performs processing for detecting the stop position of the rotor 72.

Typically, coils such as the coils 73, 74, and 75 have a configuration where copper wire is wrapped around a core that is laminated with an electromagnetic steel sheet. In addition, the permeability of the electromagnetic steel sheet decreases when there is an external magnetic field. Because the inductance of the coil is proportional to the permeability of the core, the inductance of the coil also decreases when the permeability of the core decreases. For example, because only S(south)-poles of the rotor 72 are facing the U phase coil 73 of FIG. 4A, a rate of decrease of the inductance of the coil 73 is larger than for the W phase coil 75, which is facing both of S(south)-poles and N(north)-poles of the rotor 72. In addition, an amount of change of the inductance differs in accordance with whether a direction of the magnetic field that occurs due to the excitation current and the direction of the external magnetic field are the same direction or opposite directions. Specifically, in the state of FIG. 4A, when an excitation current is supplied in the same direction as the magnetic field that occurs due to the S(south)-poles of the rotor 72 that faces the U phase coil 73, in other words to have the U phase be the N(north)-poles, the amount of decrease of the inductance becomes larger than in a case where the excitation current is supplied in a direction for having the U phase be the S(south)-poles. In this way, the detected inductance differs in accordance with the excitation phase and the stop position of the rotor 72.

Figure 5A:
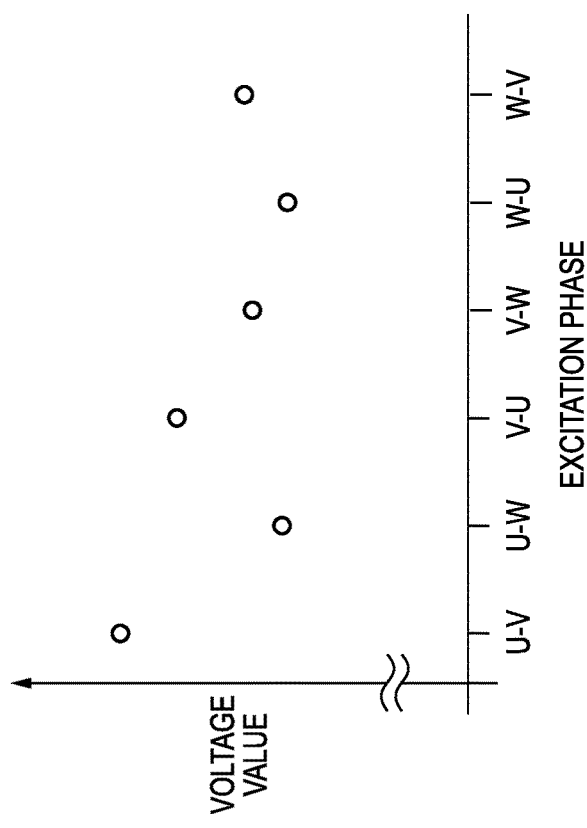
FIG. 5A is a view which illustrates a relationship between an excitation phase and a synthetic inductance.

FIG. 5A illustrates an example of the synthetic inductance of each phase, when the rotor 72 has stopped at the state of FIG. 4A. In the following description, the stop position of the rotor 72 when the U-V phase is excited as in FIG. 4A is represented as the "U-V phase position". In FIG. 5A, because the rotor 72 is stopped at the U-V phase position, the synthetic inductance detected is smallest when the U-V phase is excited. In this way, by detecting the synthetic inductance after exciting each excitation phase, it is possible to determine the stop position of the rotor 72.

Figure 5B:
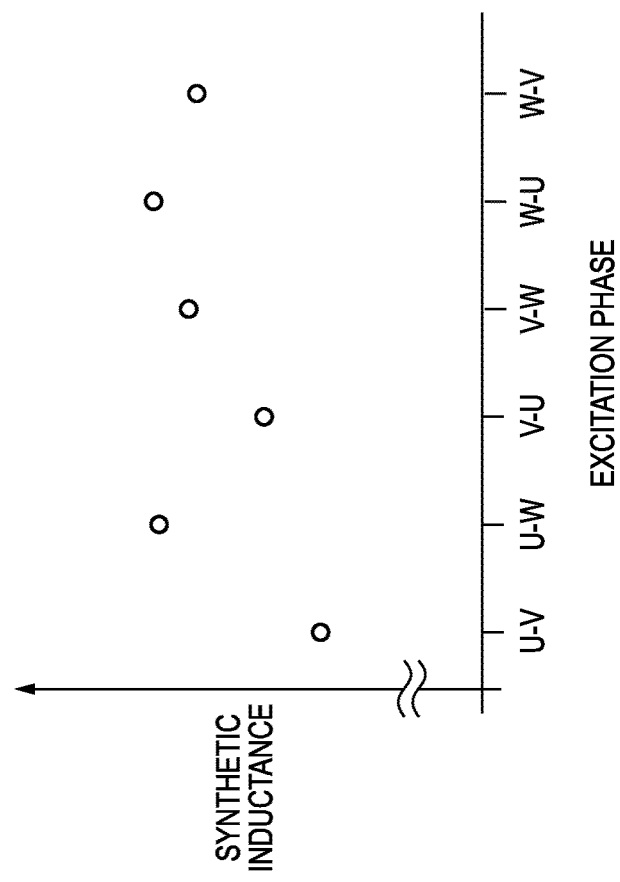
FIG. 5B is a view which illustrates a relationship between an excitation phase and a voltage value.
Figure 6:
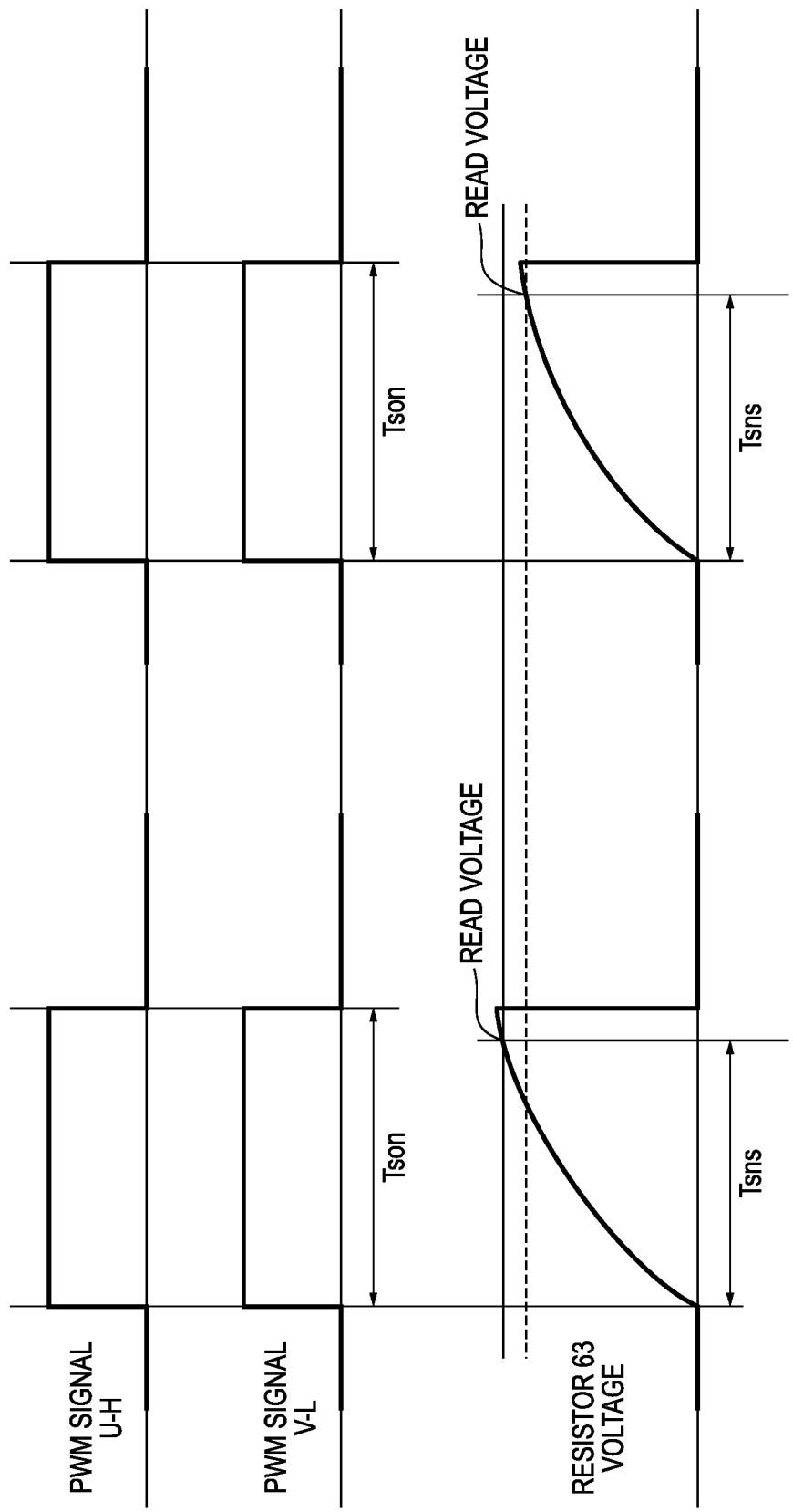
FIG. 6 is a view for describing a method for detecting a rotor stop position according to an embodiment.

The synthetic inductance can be detected based on a physical quantity detected by causing a voltage to be applied to the motor 15F so that an excitation current flows for each excitation phase, more specifically by detecting a rising edge of the excitation current. This is because, when the inductance increases, the rising edge of the excitation current is delayed, and when the inductance decreases, the rising edge of the excitation current occurs earlier. In the present embodiment, by reading the voltage that occurs at the resistor 63 by the AD converter 53, the microcomputer 51 detects the rising edge of the excitation current. Specifically, in a case of exciting the U-V phase, two PWM signals—for U-H and V-L—are set to high for predetermined time period (Tson) as illustrated by FIG. 6. At this point, the other PWM signals are all set to low. After a predetermined time period Tsns from when the PWM signals are set to high, the voltage that occurs at the resistor 63 is read by the AD converter 53. Tsns can be set to 90% of Tson, for example. FIG. 6 illustrates a situation where, in a case where the synthetic inductance is high, the rising edge of the voltage of the resistor 63 is slower than in the case where the synthetic inductance is low. FIG. 5B illustrates the voltage value of the resistor 63 with respect to each excitation phase that is measured in a state where the rotor 72 is stopped at the U-V phase position.

Next, description is given regarding a method of determining whether the rotor 72 has moved in processing for detecting the stop position of the rotor 72. As described above, because the inductance of each of the coils 73 to 75 differs for each stop position of the rotor 72, when the rotor 72 moves during measurement of an excitation phase, the measured voltage value differs before and after the movement. Consequently, it is possible to measure the voltage value a plurality of times, and determine that the rotor 72 has moved when there is something larger than a threshold value for differences in voltage values measured each time. Note that the threshold value is set to a value greater than the variation that can normally occur due to noise or the like.

Figure 7:
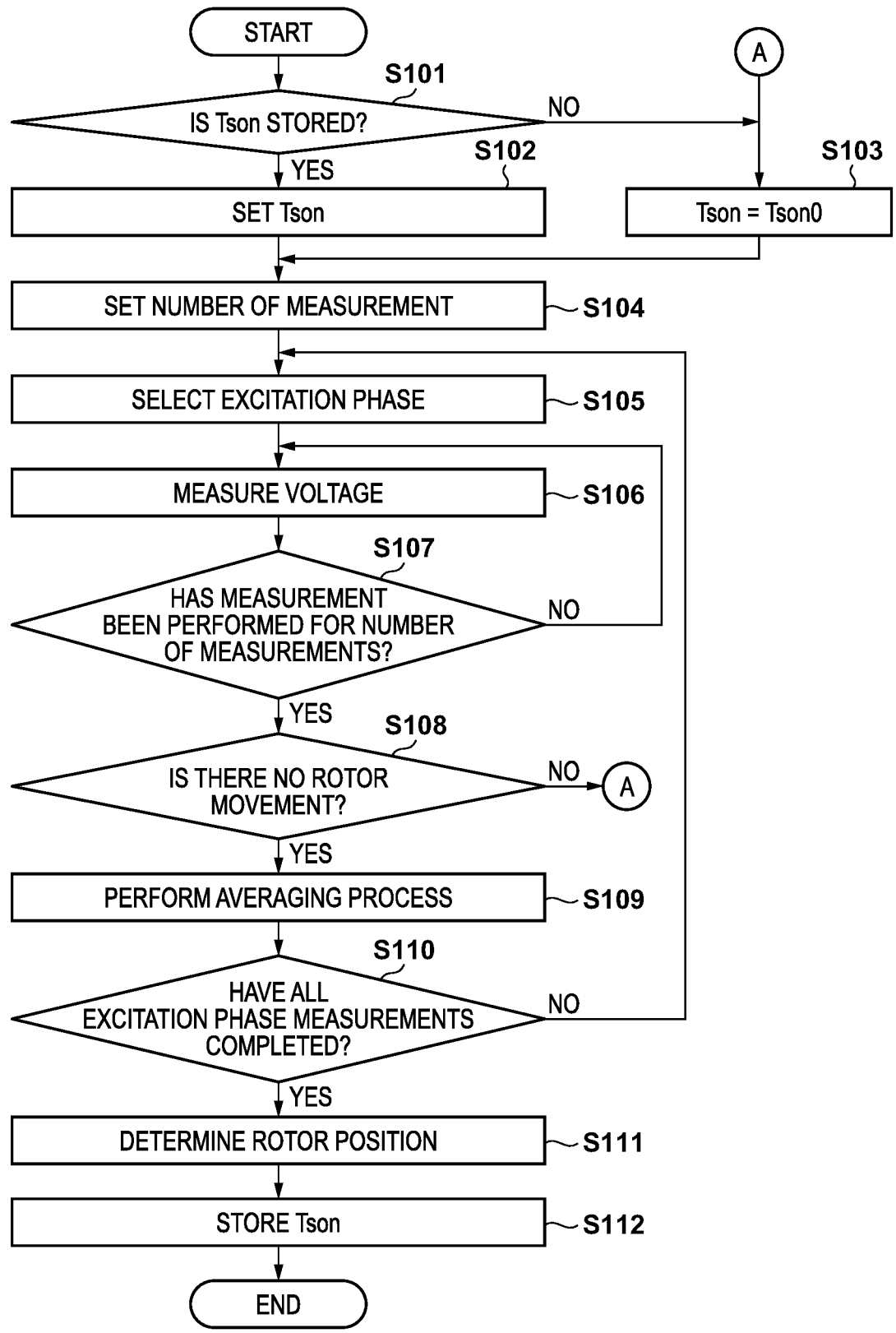
FIG. 7 is a flowchart of processing for detecting a rotor stop position according to an embodiment.

FIG. 7 is a flowchart for processing by the motor control unit 14 for detecting the stop position of the rotor 72. In step S101, the motor control unit 14 determines whether information indicating a duration Tson for causing a high-level of PWM signal to be continued is held in the non-volatile memory 55. If it is being held, in step S102, the motor control unit 14 sets Tson to a value that is read out from the non-volatile memory 55. In contrast, if this value is not stored in the non-volatile memory 55, in step S103, the motor control unit 14 sets Tson to a predetermined initial value Tson0. The initial value Tson0 is a value where the rotor 72 does not move even when the load torque of the motor 15 is a minimum, and is stored in the non-volatile memory 55 in advance in a manufacturing step or the like. As a specific numerical example, assume below that Tson0=50 µs, and Tson is set in a range from 50 µs to 200 µs in 10 µs increments.

Figure 8:
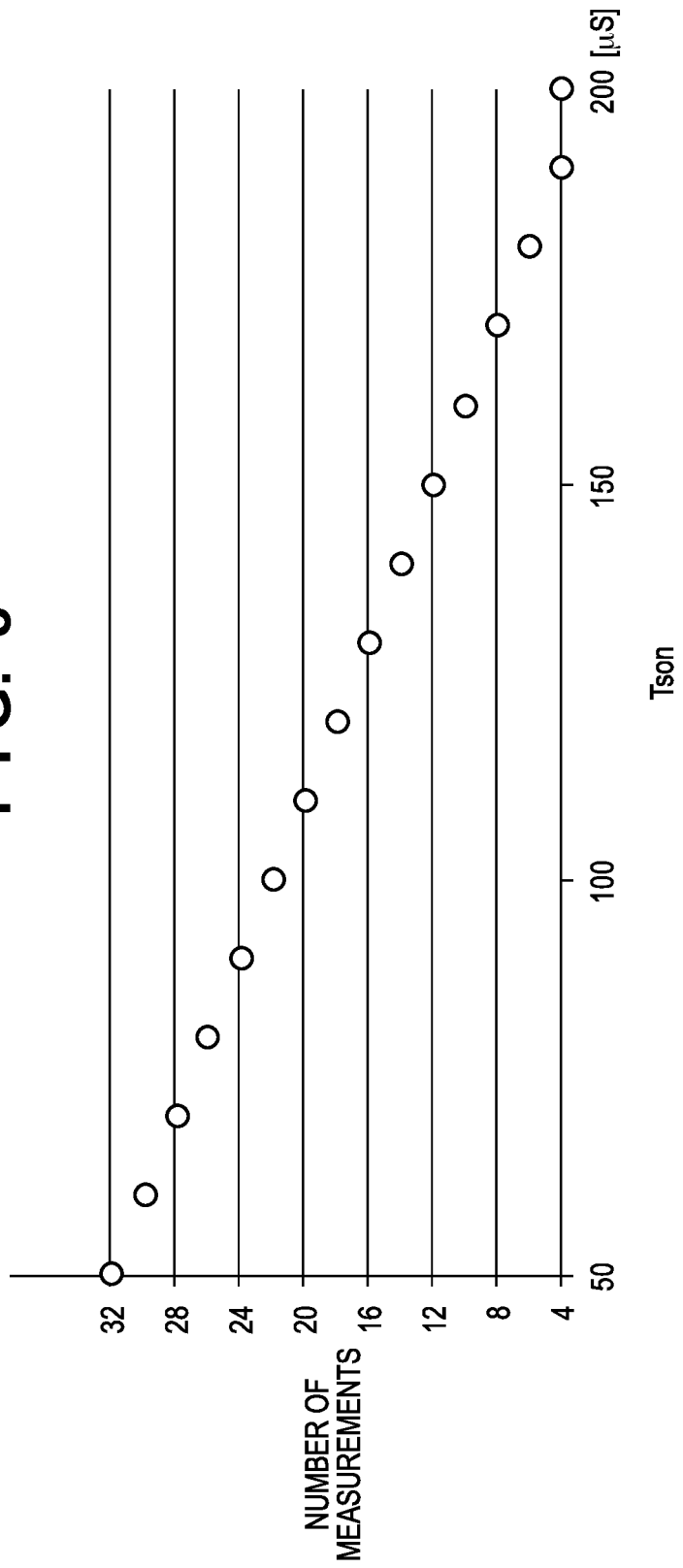
FIG. 8 is a view which illustrates a relationship between a voltage application time period and a number of measurements according to an embodiment.

Next, the motor control unit 14 sets a number of measurements in accordance with the value of Tson. An association relationship between the value of Tson and a number of measurements is stored in the non-volatile memory 55 in advance. FIG. 8 illustrates an example of an association relationship between the value of Tson and the number of measurements. Note that the motor control unit 14 measures the voltage of the resistor 63 a number of times equal to this number of measurements, and then performs an averaging process. According to FIG. 8, the minimum and maximum numbers of measurements are respectively 4 and 32, and the larger the value of Tson the lower the number of measurements. This is because, when the value of Tson increases, the excitation current increases, the voltage that occurs at the resistor 63 also increases, and thus the S/N ratio improves. In contrast, when the value of Tson decreases the number of measurements (a number that is averaged) increase because the S/N ratio degrades. By this, it is possible to suppress the influence of noise and maintain detection accuracy. Note that, in the present embodiment, it is assumed that the voltage application time period for applying a voltage to an excitation phase coil, and the number of measurements are referred to as detection conditions in processing for detecting the rotor stop position.

Returning to FIG. 7, in step S105, the motor control unit 14 selects one excitation phase. Here, the six excitation phases (permutations of two phases from the three phases) are sequentially selected. In step S106, the motor control unit 14 supplies an excitation current to the selected excitation phase, and measures the voltage of the resistor 63. In step S107, the motor control unit 14 determines whether measurement has been performed for the number of measurements set in step S104, and if this number of measurements has not been performed, the processing repeats from step S106. When the number of measurements set in step S104 has been performed, the motor control unit 14, in step S108, compares the plurality of voltage values obtained by performing the plurality of measurements, and determines whether the rotor 72 has moved. For example, it is determined that the rotor 72 has moved when a maximum value of a difference of the plurality of voltage values is greater than or equal to a predetermined threshold value, and it is determined that the rotor 72 has not moved if the differences are all less than the predetermined threshold value. Note that the threshold value uses here is stored in the non-volatile memory 55 in advance.

Upon determining that the rotor 72 has moved, the motor control unit 14, in step S103 sets the value of Tson to Tson0, and repeats processing from step S104. Tson0 and the number of measurements for this time are initial conditions for the detection conditions. The initial conditions are detection conditions to use when the load torque of the motor 15 is a minimum. Meanwhile, upon determining that there is no movement of the rotor 72, the motor control unit 14, in step S109, obtains an average value of the measured plurality of voltage values. In step S110, the motor control unit 14 determines whether measurement has completed for all excitation phases, and repeats processing from step S105 when it has not completed.

When measurement completes for all combinations of excitation phases, the motor control unit 14, in step S111, determines the stop position of the rotor 72 based on the average value of the voltage obtained in step S109 for each excitation phase. As illustrated by FIG. 5B, because the synthetic inductance detected when the U-V phase is excited is lowest when the rotor 72 is stopped at the U-V phase position, the voltage value of the resistor 63 is highest when a voltage is applied so that an excitation current is supplied to the U-V phase. Therefore, the motor control unit 14 can determine the stop position of the rotor 72 in accordance with the maximum value of the voltages measured for each excitation phase. In step S112, the motor control unit 14 stores the value of Tson in the non-volatile memory 55, and ends the processing of FIG. 7.

Figure 9:
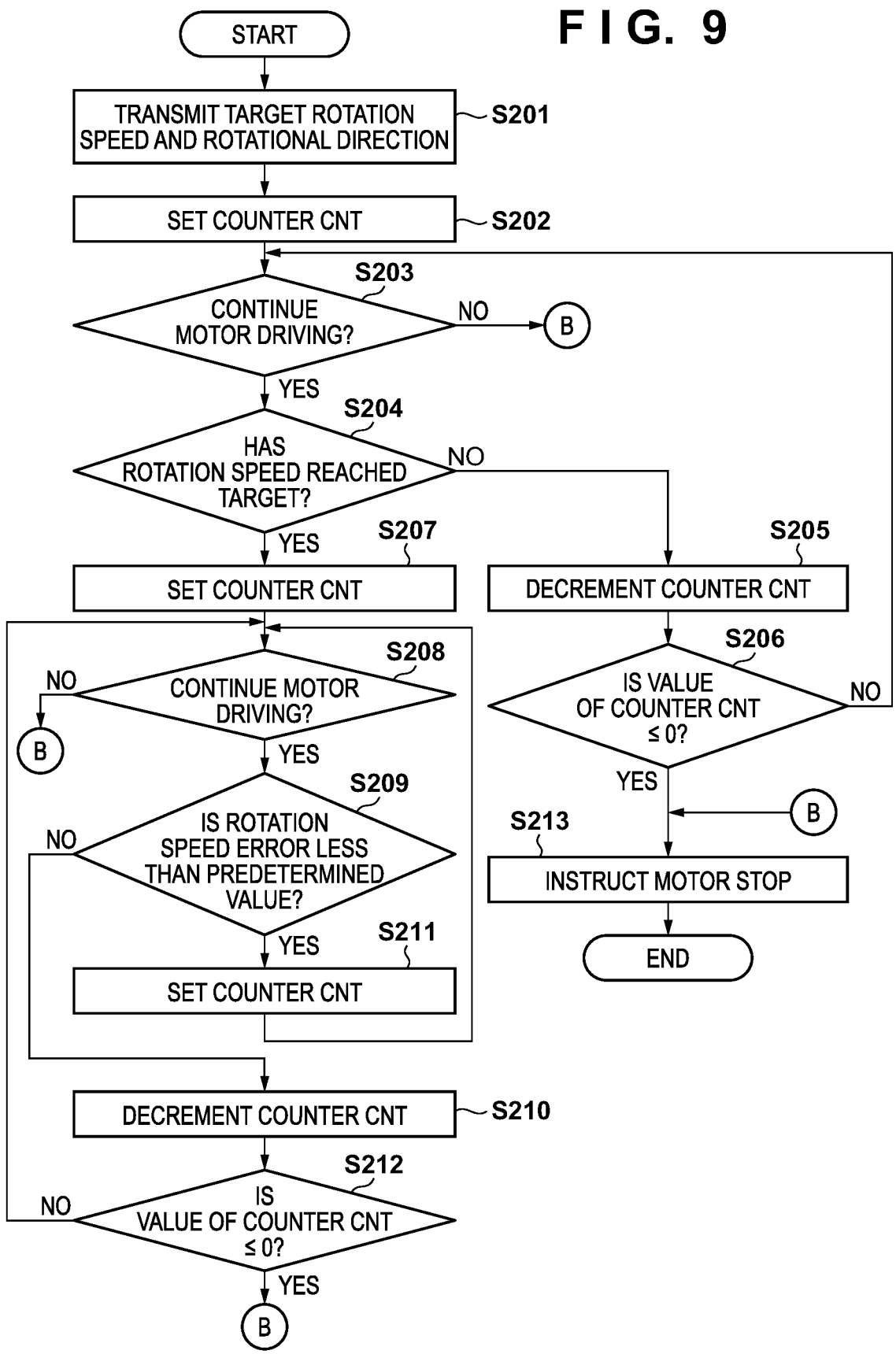
FIG. 9 is a flowchart of processing in a printer control unit according to an embodiment.
Figure 10:
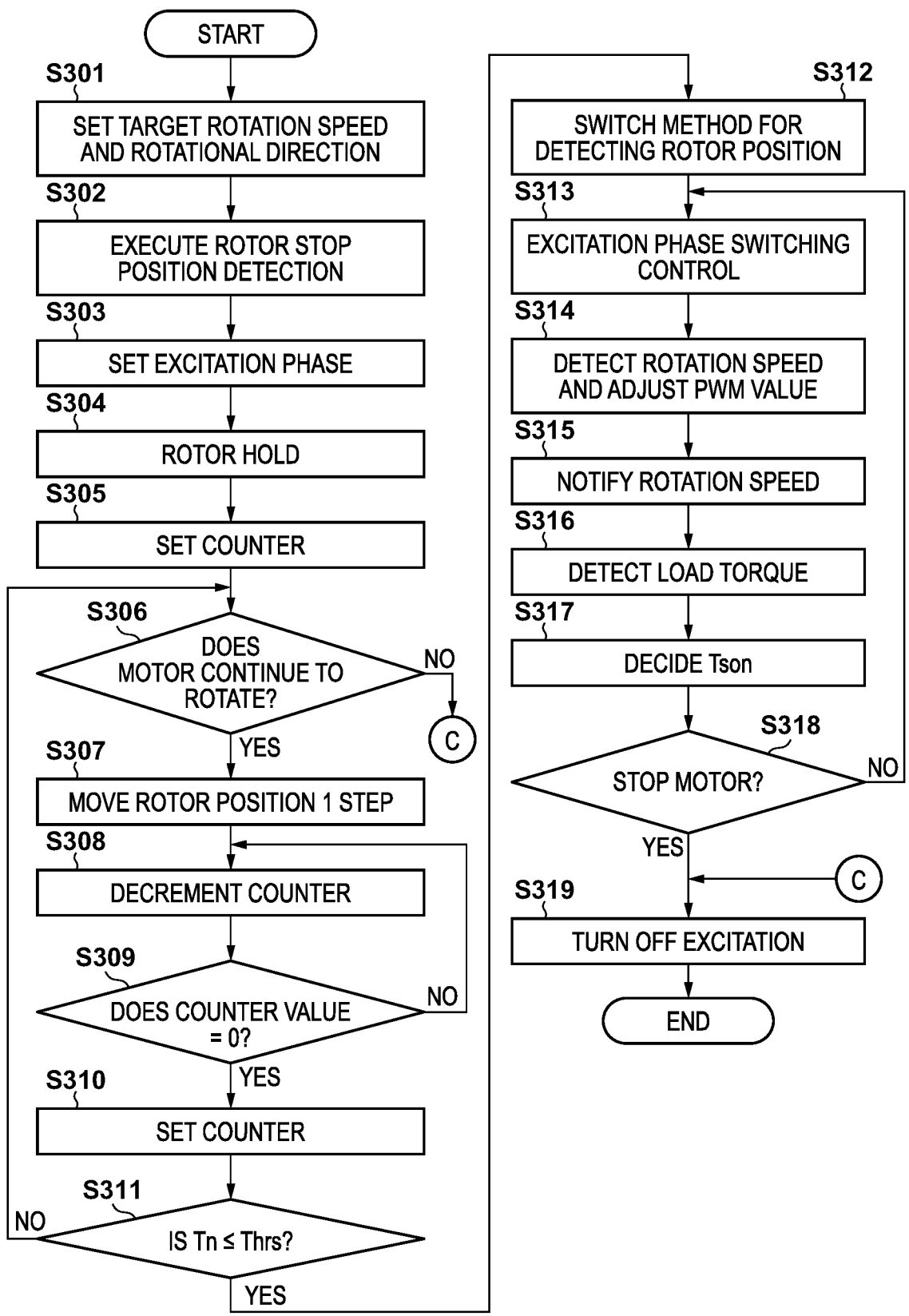
FIG. 10 is a flowchart of processing by a motor control unit according to an embodiment.

Next, description is given regarding a series of motor control processes from motor activation to motor stop, that includes processing for detecting the rotor stop position. FIG. 9 is a flowchart that illustrates processing in the printer control unit 11, and FIG. 10 is a flowchart that illustrates processing in the motor control unit 14. Firstly, description is given regarding the flowchart of FIG. 9. In step S201, the printer control unit 11 instructs the motor control unit 14 to drive the motor 15F. At this point, the printer control unit 11 notifies a rotational direction and a target rotation speed of the motor 15F to the motor control unit 14. Furthermore, the printer control unit 11 can notify a control loop gain setting or the like. In step S202, the printer control unit 11 sets a non-illustrated counter CNT for a timeout to a predetermined value. The predetermined value is set larger than a value that corresponds to an amount of time necessary for acceleration of the motor 15F.

In step S203, the printer control unit 11 determines whether to cause the motor 15F to stop. In a case of causing the motor 15F to stop, in step S213, the printer control unit 11 instructs the motor control unit 14 to stop the motor 15F. Meanwhile, in a case of continuing rotation of the motor 15F, in step S204 the printer control unit 11 determines whether the motor 15F has reached the target rotation speed. Note that the rotation speed of the motor 15F is notified from the motor control unit 14. When rotation speed has not reached the target rotation speed, the printer control unit 11 in step S205 decrements the counter CNT, and in step S206 determines whether the counter CNT is less than or equal to 0. The printer control unit 11 repeats processing from step S203 when the counter CNT is not less than or equal to 0. Meanwhile, when the counter CNT is less than or equal to 0, the printer control unit 11 determines that a malfunction has occurred, and, in step S213, instructs the motor control unit 14 to stop the motor 15F.

Meanwhile, when the rotation speed of the motor 15F has reached the target rotation speed within the predetermined time period in step S204, the printer control unit 11, in step S207 sets the counter CNT to a predetermined value. Note that, so that it is possible to quickly stop the motor 15F in a case where a malfunction or the like has occurred, the value set in step S207 corresponds to one second, for example. The printer control unit 11, in step S208, determines whether to cause the motor 15F to stop, and, in a case of causing the motor 15F to stop, in step S213 instructs the motor control unit 14 to stop the motor 15F. Meanwhile, in a case of continuing rotation of the motor 15F, the printer control unit 11 determines whether a difference between the rotation speed of the motor 15F and the target rotation speed, in other words a rotation speed error, is less than or equal to a predetermined value. When the rotation speed error exceeds the predetermined value, the printer control unit 11 in step S210 decrements the counter CNT, and in step S212 determines whether the counter CNT is less than or equal to 0. When the counter CNT is less than or equal to 0, the printer control unit 11 determines that a malfunction has occurred, and, in step S213, instructs the motor control unit 14 to stop the motor 15F. Meanwhile, when the counter CNT is not less than or equal to 0, the printer control unit 11 repeats processing from step S208. Meanwhile, when the rotation speed error is less than or equal to the predetermined value in step S209, the printer control unit 11, in step S211, sets the counter CNT to the same value set in step S207 again, and repeats processing from step S208.

Next, description is given regarding the flowchart of FIG. 10. Upon being instructed by the printer control unit 11 to drive the motor 15F, the motor control unit 14, in step S301, sets the rotational direction and the target rotation speed that were instructed. Subsequently, the motor control unit 14, in step S302, performs the processing for detecting the stop position of the rotor 72 that was described using FIG. 7. In accordance with a result of detecting the stop position of the rotor 72, the motor control unit 14, in step S303, sets an excitation phase for holding the rotor 72 to the current stop position, and, in step S304, supplies an excitation current to the excitation phase to hold the rotor 72. The duty ratio of the PWM signal at this point is set to a first duty ratio. The first duty ratio is a duty ratio for generating torque of a level that will not move the rotor 72, and is stored in the non-volatile memory 55 in advance.

The motor control unit 14, in step S305, sets the counter 54 to an initial value T1. The motor control unit 14, in step S306, determines whether the printer control unit 11 has instructed stoppage of the motor 15. When the printer control unit 11 has made an instruction that the motor 15F be stopped, the motor control unit 14, in step S319, turns excitation off—in other words causes the excitation current to stop. However, if the printer control unit 11 has not made an instruction to stop the motor 15F, the motor control unit 14, in step S307, causes the rotor 72 to move from its current position by only one step in the instructed rotational direction. The duty ratio of PWM signals after this operation are set to a second duty ratio. The second duty ratio is a duty ratio for generating torque that enables the motor 15F to accelerate, and is stored in the non-volatile memory 55 in advance.

The motor control unit 14, in step S308, reduces the value of the counter 54 by one, and, in step S309 determines whether the value of the counter 54 is 0. The motor control unit 14 repeats the processing of step S308 and step S309 until the value of the counter 54 is 0. When the value of the counter 54 is 0, the motor control unit 14, in step S310, sets the counter 54 to a value T2. Here, the value T2 is assumed to be smaller than the value T1. The motor control unit 14, in step S311, determines whether the value T2 set to the counter 54 is less than or equal to a predetermined threshold value Tthrs, and repeats the processing from step S306 when the value T2 is not less than or equal to the predetermined threshold value Tthrs. In subsequent repetitions of step S306 through step S311, the value set to the counter 54 in step S310 becomes less than the value set to the counter 54 in step S310 of the previous time. Note that the relationship of a ratio between the value set to the counter 54 and the value set to the counter 54 the previous time is decided in advance, so that it is possible for torque that occurs for the motor 15F exceeds torque necessary to drive a load and for the motor 15F to accelerate, and stored in the non-volatile memory 55. In addition, the threshold value Tthrs is a value for which a movement time for one step of the motor 15F, in other words a rotation speed, exceeds the rotation speed that enables position detection of the rotor 72 by an induced voltage, in other words position detection of the rotor 72 in accordance with input to the interrupt ports 57 of FIG. 3. Note that the threshold value Tthrs is also stored in the non-volatile memory 55 in advance.

When the set value of the counter 54 is less than or equal to the threshold value Tthrs, the motor control unit 14, in step S312, switches to position detection of the rotor 72 in accordance with a publicly known induced voltage waveform. Subsequently, the motor control unit 14, in step S313, switches the excitation phase in accordance with a result of detecting the position of the rotor 72. In addition, the motor control unit 14 performs speed control in step S314. In other words, from the result of detecting the position of the rotor 72 and the timing of the detection, the rotation speed of the motor 15F is obtained, and the duty ratio of the PWM signal is adjusted to perform speed control so that there ceases to be an error between the target rotation speed and the obtained rotation speed. Furthermore, the motor control unit 14, in step S315, notifies the printer control unit 11 of the rotation speed of the motor 15F. The motor control unit 14, in step S316, calculates the load torque of the motor 15F from the excitation current of each phase.

The motor control unit 14 in step S317 decides the value of Tson in accordance with the load torque calculated in step S316, and stores this value in the non-volatile memory 55. An association relationship between the load torque and Tson is stored in the non-volatile memory 55 in advance. For example, the value of Tson increases if the load torque increases, and the value of Tson decreases if the load torque decreases. Note that, as described above, an upper limit and a lower limit are provided for the value of Tson. In the present example, a minimum value of Tson is 50 μs, and the maximum value is 200 μs. In this way, the motor control unit 14 functions as a load determination unit for determining the magnitude of a load based on the excitation current and storing it in the non-volatile memory 55 when the rotation speed of the rotor 72 is greater than a predetermined speed. The motor control unit 14, in step S318, determines whether the printer control unit 11 has instructed stoppage of the motor 15F, and when stoppage is instructed, in step S319 turns excitation off—in other words causes the excitation current to stop. Meanwhile, when the printer control unit 11 is not instructing stoppage of the motor 15F, processing repeats from step S313.

Note that the value of Tson that is decided in step S317 and stored in the non-volatile memory 55 is used in subsequent processing for detecting the rotor stop position (FIG. 7). By this, it is possible to use detection conditions in accordance with the load torque to perform processing for detecting the stop position of the rotor 72.

Therefore, by virtue of the present embodiment, detection conditions for the rotor stop position in accordance with the load condition of the motor 15F, in other words Tson which is a voltage application time period and a number of measurements in accordance with Tson, are set, and processing for detecting the rotor stop position is performed. By performing detection processing with detection conditions in accordance with the magnitude of the load of the motor 15F, it is possible to suppress the amount of time required for the detection processing from becoming unnecessarily long. Specifically, the detection processing is performed in a short amount of time when the load torque is large, and even when the load torque is low, it is possible to suppress a decrease of detection accuracy and detect the stop position of the rotor with good accuracy. In addition, in the processing for detecting the rotor stop position, whether the rotor 72 has moved is determined, and because detection conditions for the rotor stop position are changed to initial conditions when the rotor 72 has moved and the processing for detecting the rotor stop position is performed again, it is possible to prevent a misdetection of the rotor stop position.

Note that, the present embodiment, a minimum number of measurements was given as four, but it may be one. In such a case, when the number of measurements is two or more, the stop position of the rotor 72 is determined in accordance with an average value of the voltage measured each time, and when the number of measurements is one, the stop position of the rotor 72 is determined in accordance with the measured voltage. Note that, in a case of determining movement of the rotor 72, a minimum number of measurements is set to two or more.

Note that the motor control unit 14 described above can be implemented as a motor control apparatus. In addition, the motor control unit 14 and the portion corresponding to motor control of the printer control unit 11 described above can be implemented as a motor control apparatus. Furthermore, although description was given in the present embodiment by giving an example of control of the motor 15F that drives the fixing device 24, the present invention can similarly be applied to a motor for driving a respective roller for conveyance of a sheet in an image forming apparatus, for example. Note that the two rollers of the fixing device 24 are also for conveyance of a sheet. In other words, the present invention can similarly be applied to a motor for causing a rotation member for conveying a sheet along a conveyance path to be driven rotationally.

Second Embodiment

Figure 11A:
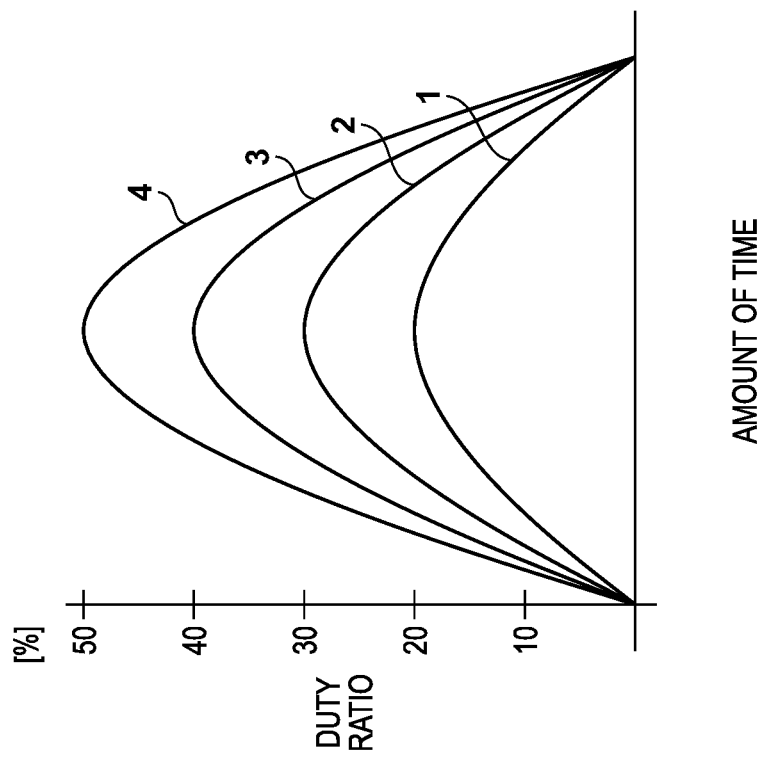
FIG. 11A is a view which illustrates a profile according to an embodiment.
Figure 11B:
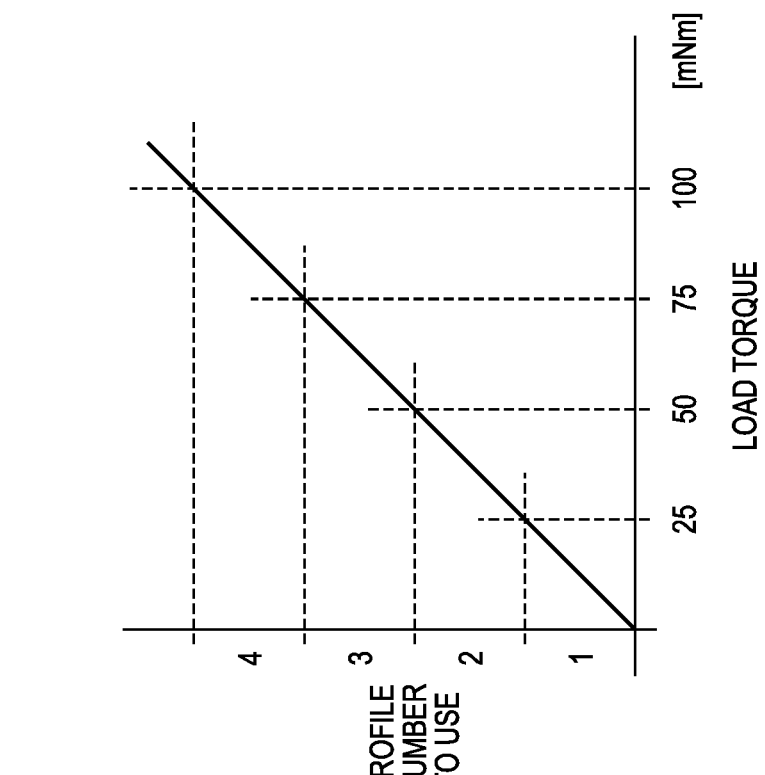
FIG. 11B is a view for describing selection of a profile according to an embodiment.

Next, description is given regarding the second embodiment focusing on points of difference with the first embodiment. In the first embodiment, a voltage of the rectangular waveform illustrated in FIG. 6 is applied in processing for detecting the stop position of the rotor 72. Specifically, the detection conditions in the first embodiment were a time period for applying the voltage to the excitation phase, and a number of measurements. In the present embodiment, in processing for detecting the stop position of the rotor 72, a voltage that follows the PWM signal, in other words a pulse voltage, is applied to a coil for a predetermined time period. In such a case, the duty ratio of the PWM signal is caused to change in accordance with a sinusoid profile. FIG. 11A illustrates an example of a profile. In FIG. 11A, reference numerals 1 to 4 are each a profile number. This plurality of profiles are stored in the non-volatile memory 55 in advance. The motor control unit 14 selects a profile to use in accordance with the load torque of the motor 15F. FIG. 11B illustrates a relationship between the load torque and a profile to use. As illustrated in FIG. 11B, a profile having a larger duty ratio maximum is selected the larger the load torque is. Note that an association relationship between the load torque and a profile to select is stored in the non-volatile memory 55 in advance. In this way, the detection conditions in the present embodiment are the maximum value of the duty ratio of the pulse voltage to apply to a coil, and the number of measurements.

Figure 12:
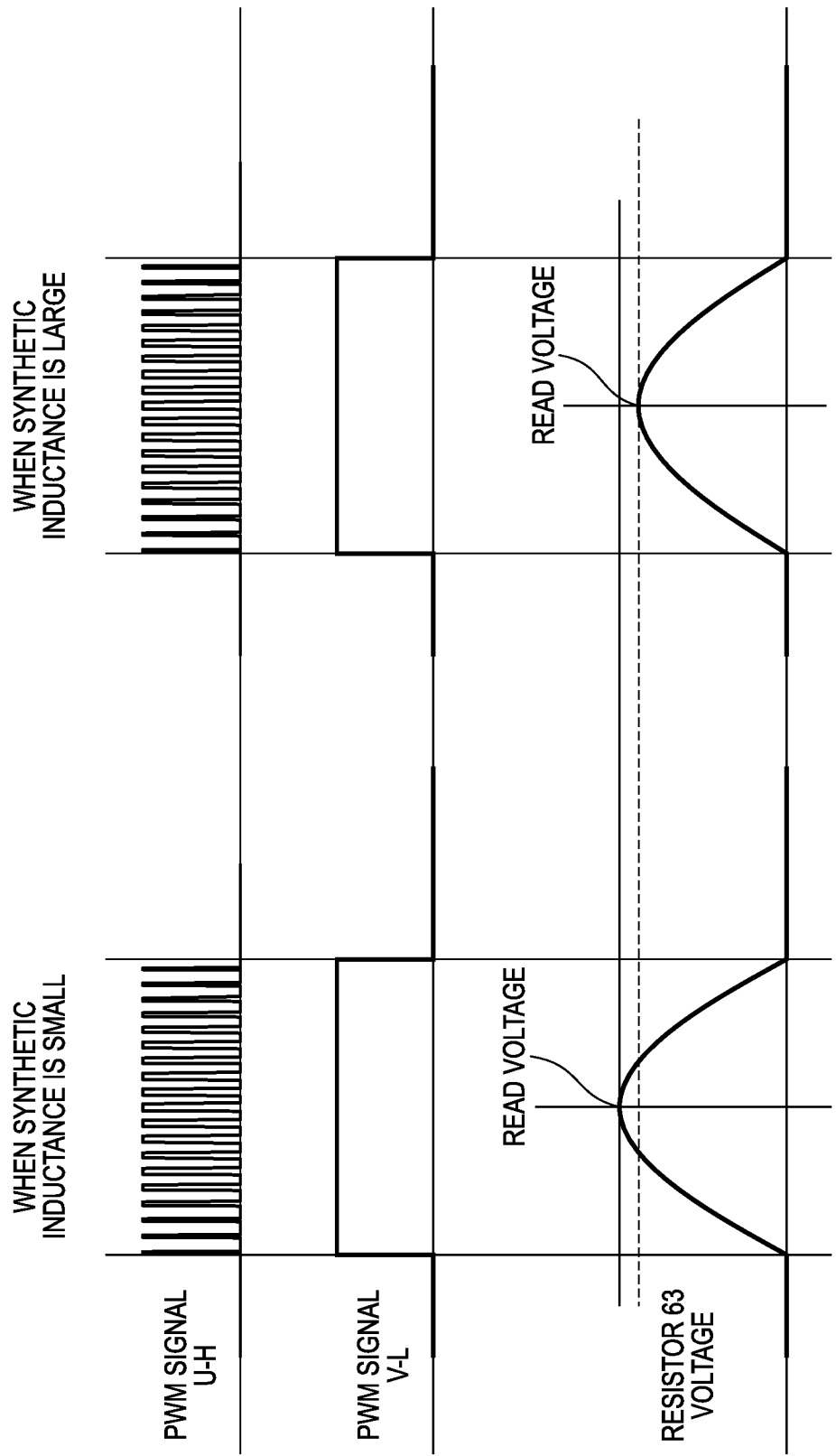
FIG. 12 is a view for describing a method for detecting a rotor stop position according to an embodiment.

For example, in a case of exciting the U-V phase, as illustrated by FIG. 12, for the U-H PWM signal, the duty ratio is caused to change in accordance with the selected profile, and the V-L PWM signal is set to a high level. In this case, the excitation current is a sinusoid as illustrated in FIG. 12. Because a peak value of the excitation current increases as the inductance of the coil decreases, the microcomputer 51 detects the inductance in accordance with the peak value (a maximum value) of the voltage that occurs at the resistor 63. In addition, the motor control unit 14 decides the number of measurements in accordance with the selected profile. For example, the number of measurements for the profile numbers 1, 2, 3, and 4 are respectively 32, 24, 12, and 4. In other words, the motor control unit 14 sets the number of measurements to be smaller the larger the load torque is.

Figure 13:
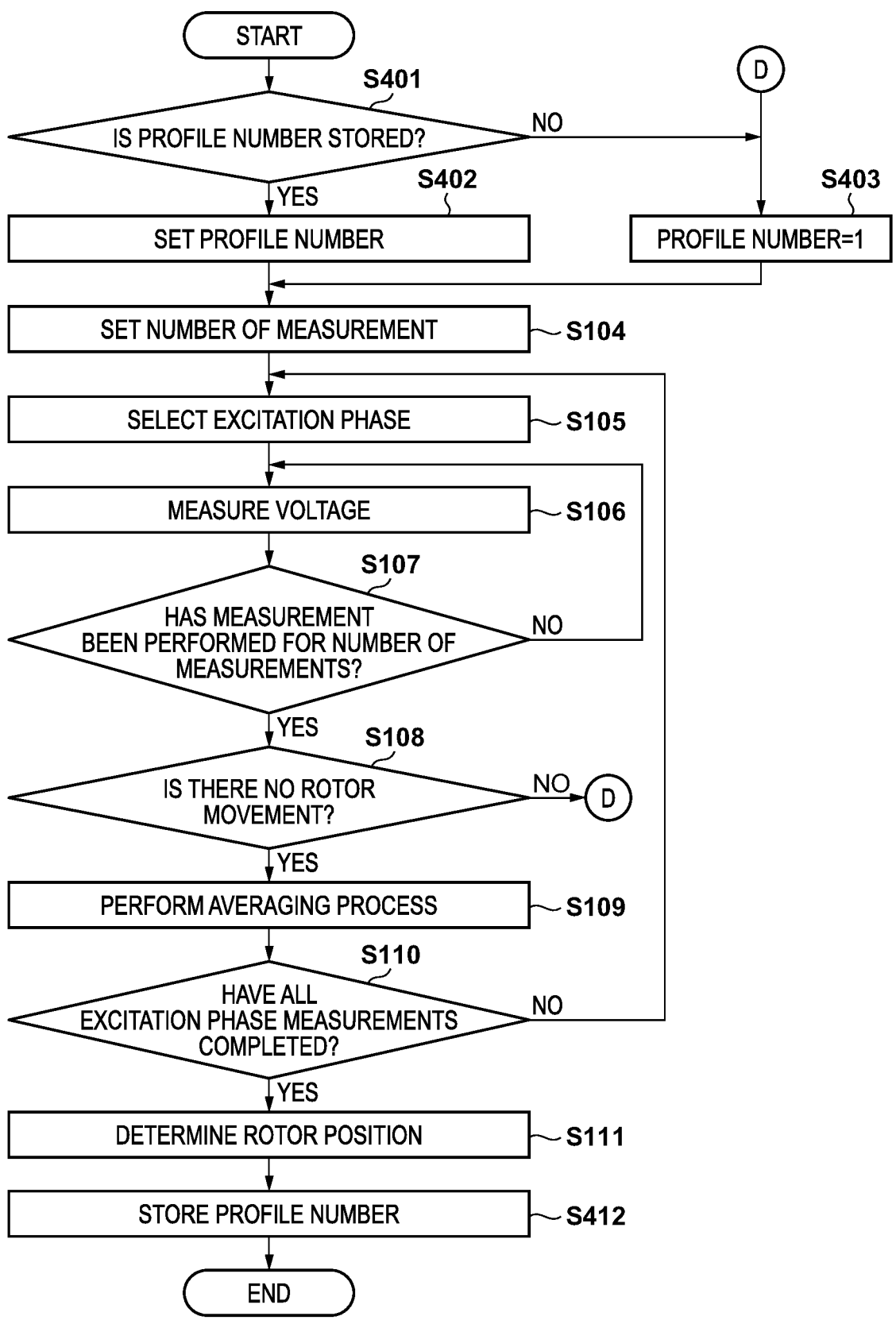
FIG. 13 is a flowchart of processing for detecting a rotor stop position according to an embodiment.

In processing for detecting the stop position of the rotor 72 in the present embodiment, step S101 through step S103 and step S112 of FIG. 7 are replaced by step S401 through step S403 and step S412 as illustrated by FIG. 13. Specifically, the motor control unit 14, in step S401, determines whether a profile number is stored in the non-volatile memory 55. When it is stored, the motor control unit 14, in step S402, sets a value read out from the non-volatile memory 55 as the profile number. Meanwhile, when a profile number is not stored in the non-volatile memory 55, the motor control unit 14, in step S403, sets the profile number 1 as the profile number. In addition, in the present embodiment, the profile number is also stored in the non-volatile memory 55 in step S412. Furthermore, in step S317 of FIG. 10, a profile number based on the load torque is stored in the non-volatile memory 55.

Therefore, in the present embodiment, the duty ratio of a PWM signal is caused to change with time. Note that, in FIG. 11A, the duty ratio is caused to increase with the passage of time, and from the center of the voltage application time period, the duty ratio is caused to decrease with the passage of time. The maximum value of the duty ratio is thus caused to differ for each profile. However, it is sufficient if the duty ratio increases and subsequently decreases with the passage of time, and the present invention is not limited to profiles whose maximum duty ratio is at the center of the voltage application time period. There are cases where sound occurs due to a magnetostriction phenomenon when a rectangular waveform voltage is applied to a coil, as in the first embodiment. In the present embodiment, it is possible to suppress the occurrence of sound due to this magnetostriction phenomenon by causing the duty ratio of a PWM signal to smoothly change in a sinusoid shape, for example.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-234299, filed on Dec. 6, 2017, which is hereby incorporated by reference herein in its entirety.

What is claimed is:

1. A motor control apparatus, comprising:
a voltage control unit configured to control a voltage to apply to a plurality of coils in order to cause a rotor of a motor that includes the plurality of coils to rotate;
a load determination unit configured to, based on an excitation current supplied to the plurality of coils when a rotation speed of the rotor is greater than a predetermined speed, determine a load torque of the motor; and
a detection unit configured to set a detection condition of a stop position of the rotor based on the load torque, and to perform detection processing of the stop position of the rotor in accordance with the set detection condition,
wherein the detection condition includes applying the voltage to the plurality of coils by the voltage control unit for a first time period to detect the stop position of the rotor in a case where the load torque is a first value, and the detection condition includes applying the voltage to the plurality of coils by the voltage control unit for a second time period shorter than the first time period to detect the stop position of the rotor in a case where the load torque is a second value smaller than the first value.

2. The motor control apparatus according to claim 1, wherein the detection unit is further configured to detect the stop position of the rotor based on a physical quantity for each of excitation phases that are detected in the detection processing by causing the voltage control unit to apply the voltage so that an excitation current is supplied to each of the excitation phases, and
the excitation phases are permutations of two coils out of the plurality of coils.

3. The motor control apparatus according to claim 2, wherein
in the detection processing, the detection unit is further configured to detect the physical quantity for each of the excitation phases a number of times, and
the detection unit is further configured to, when the number of times is two or more, detect the stop position of the rotor based on an average value of the physical quantity detected at each time for each of the excitation phases.

4. The motor control apparatus according to claim 3, wherein
the number of times is two or more, and
the detection unit is further configured to, for each of the excitation phases, when a difference of physical quantities detected each time is larger than a threshold value, change the detection condition to an initial condition, and detect the stop position of the rotor based on the initial condition.

5. The motor control apparatus according to claim 4, wherein the initial condition is a detection condition that is set when the load torque of the motor is smallest.

6. The motor control apparatus according to claim 3, wherein the detection unit is further configured to increase the number of times when the load torque of the motor decreases.

7. The motor control apparatus according to claim 2, wherein the detection condition includes a time period for causing the voltage control unit to apply the voltage.

8. The motor control apparatus according to claim 7, wherein the physical quantity is a speed of a rising edge of the excitation current supplied to an excitation phase when the voltage control unit applies the voltage to the excitation phase.

9. The motor control apparatus according to claim 7, wherein the detection unit is further configured to shorten the time period when the load torque of the motor decreases.

10. The motor control apparatus according to claim 2, wherein the voltage control unit is further configured to apply a pulse voltage, in which a duty ratio changes, to an excitation phase for a predetermined time period, in the detection processing, and the detection condition includes a maximum value of the duty ratio of the pulse voltage.

11. The motor control apparatus according to claim 10, wherein the physical quantity is a maximum value of the excitation current supplied to the excitation phase when the voltage control unit applies the pulse voltage to the excitation phase.

12. The motor control apparatus according to claim 10, where the duty ratio of the pulse voltage decreases after increasing to the maximum value in the predetermined time period.

13. The motor control apparatus according to claim 12, where, in the predetermined time period, the duty ratio of the pulse voltage changes with time in a sinusoid from 0 to 0, passing through a maximum value.

14. The motor control apparatus according to claim 10, wherein the detection unit is further configured to decrease the maximum value of the duty ratio of the pulse voltage when the load torque of the motor decreases.

15. An image forming apparatus, comprising:
a rotation member for conveying a sheet along a conveyance path;
an image formation unit configured to form an image on the sheet that is conveyed on the conveyance path;
a motor configured to drive the rotation member or the image formation unit; and
a motor control unit configured to control the motor, wherein
the motor control unit comprises:
a voltage control unit configured to control a voltage to apply to a plurality of coils in order to cause a rotor of a motor that includes the plurality of coils to rotate;
a load determination unit configured to, based on an excitation current supplied to the plurality of coils when a rotation speed of the rotor is greater than a predetermined speed, determine a load torque of the motor; and
a detection unit configured to set a detection condition of a stop position of the rotor based on the load torque, and to perform detection processing of the stop position of the rotor in accordance with the set detection condition,
wherein the detection condition includes applying the voltage to the plurality of coils by the voltage control unit for a first time period to detect the stop position of the rotor in a case where the load torque is a first value, and the detection condition includes applying the voltage to the plurality of coils by the voltage control unit for a second time period shorter than the first time period to detect the stop position of the rotor in a case where the load torque is a second value smaller than the first value.

* * * * *